United States Patent
Miller et al.

(10) Patent No.: US 11,316,671 B2
(45) Date of Patent: Apr. 26, 2022

(54) ACCELERATED ENCRYPTION AND DECRYPTION OF FILES WITH SHARED SECRET AND METHOD THEREFOR

(71) Applicant: CYPHRE SECURITY SOLUTIONS, LLC, Houston, TX (US)

(72) Inventors: Bruce D. Miller, North Reading, MA (US); Townsend J Smith, III, McKinney, TX (US); Vihar R Rai, Cedar Park, TX (US); Benjamin M Collins, Williamsburg, VA (US)

(73) Assignee: Viasat, Inc., Carlsbad, CA (US)

( * ) Notice: Subject to any disclaimer, the term of this patent is extended or adjusted under 35 U.S.C. 154(b) by 874 days.

(21) Appl. No.: 15/738,558

(22) PCT Filed: Jun. 22, 2016

(86) PCT No.: PCT/US2016/038733
§ 371 (c)(1),
(2) Date: Dec. 20, 2017

(87) PCT Pub. No.: WO2016/209939
PCT Pub. Date: Dec. 29, 2016

(65) Prior Publication Data
US 2018/0191495 A1      Jul. 5, 2018

Related U.S. Application Data

(60) Provisional application No. 62/182,695, filed on Jun. 22, 2015.

(51) Int. Cl.
| | |
|---|---|
| *H04L 9/08* | (2006.01) |
| *G06F 21/62* | (2013.01) |
| *G06F 21/60* | (2013.01) |
| *H04L 9/06* | (2006.01) |
| *H04L 29/06* | (2006.01) |
| *G06F 7/58* | (2006.01) |
| *H04L 9/30* | (2006.01) |

(52) U.S. Cl.
CPC .......... *H04L 9/0841* (2013.01); *G06F 21/602* (2013.01); *G06F 21/6218* (2013.01);
(Continued)

(58) Field of Classification Search
None
See application file for complete search history.

(56) References Cited

U.S. PATENT DOCUMENTS

| 6,091,820 A | 6/2000 | Aziz |
| 2002/0042859 A1* | 4/2002 | Lowry ................ G06F 21/6245 |
| | | 711/100 |

(Continued)

FOREIGN PATENT DOCUMENTS

WO         2013/116916 A1     8/2013

OTHER PUBLICATIONS

Office Action (Communication pursuant to Article 94(3) EPC) dated May 8, 2020, by the European Patent Office in corresponding European Application No. 16 815 208.0-1218, 7 pages.
(Continued)

*Primary Examiner* — William J. Goodchild
(74) *Attorney, Agent, or Firm* — Holland & Hart LLP (57) ABSTRACT

A non-transitory computer-readable medium for sharing protected content, comprising instruction stored thereon. When executed on a processor, the instruction performs steps of deriving a shared secret, processing the shared secret using a secure hash algorithm 256 cryptographic hash to produce a primary encryption key, and encrypting a secondary encryption key using the primary encryption key. When the shared secret is derived between a private key and a public key of a first user, encrypting the protected content using the secondary encryption key, and transmitting the encrypted protected content to a server to be accessed by the second user. When the shared secret is derived between the
(Continued)

private key of the first user and a public key of a second user, transmitting the secondary encryption key to the second user. The second user uses the secondary encryption key to decrypt the encrypted protected content on the server.

26 Claims, 6 Drawing Sheets (52) U.S. Cl.
CPC ........ *G06F 21/6272* (2013.01); *H04L 9/0631* (2013.01); *H04L 9/0643* (2013.01); *H04L 9/0822* (2013.01); *H04L 9/0863* (2013.01); *H04L 9/0869* (2013.01); *H04L 63/0442* (2013.01); *G06F 7/588* (2013.01); *G06F 2221/2107* (2013.01); *H04L 9/3066* (2013.01); *H04L 2209/12* (2013.01); *H04L 2209/60* (2013.01)

(56) References Cited

U.S. PATENT DOCUMENTS

| | | | | |
|---|---|---|---|---|
| 2007/0223685 A1* | 9/2007 | Boubion | ............... | H04L 9/3231 380/2 |
| 2008/0130895 A1* | 6/2008 | Jueneman | ............. | H04L 9/3252 380/277 |
| 2010/0290624 A1 | 11/2010 | Buer et al. | | |
| 2014/0013452 A1* | 1/2014 | Aissi | ....................... | G06F 21/85 726/30 |
| 2014/0064491 A1 | 3/2014 | Ghouti et al. | | |
| 2015/0095648 A1* | 4/2015 | Nix | ......................... | G06F 21/35 713/170 |
| 2015/0095649 A1* | 4/2015 | Johnson | ................. | H04L 63/02 713/171 |
| 2015/0124961 A1 | 5/2015 | Lambert et al. | | |

OTHER PUBLICATIONS

Office Action (Communication pursuant to Article 94(3) EPC) dated Sep. 4, 2019, by the European Patent Office in corresponding European Application No. 16 815 208.0-1218, 5 pages.

International Search Report (Form PCT/ISA/210) dated Sep. 7, 2016, by the Japanese Patent Office in corresponding International Application No. PCT/US2016/038733, (1 page).

Extended European Search Report dated Oct. 29, 2018, issued by the European Patent Office in corresponding European Application No. 16815208.0-1218 (9 pages).

Anonymous,"Diffie-Hellman key exchange" Wikipedia, https://en.wikipedia.org/w/index.php?title=Diffie_Hellman_key_exchange&oldid,665024571, 10 pages.

* cited by examiner

ACCELERATED ENCRYPTION AND DECRYPTION OF FILES WITH SHARED SECRET AND METHOD THEREFOR

RELATED APPLICATIONS

This application claims the benefit under 35 U.S.C. § 119(e) of U.S. Provisional Patent Application Ser. No. 62/182,695 titled Method for Accelerated Encryption and Decryption of Files with a Shared Secret filed Jun. 22, 2015, the content of which is incorporated herein by reference in its entirety.

FIELD

This disclosure relates generally to cyber security, and more specifically to sharing protected content with multiple users.

BACKGROUND

Cryptography protects data with a cryptographic key. Modern cryptography generally uses a single cryptographic key to protect a large amount of data. It is important and valuable in the marketplace to increase security with stronger multiple keys, reducing the blast radius of data exposure, while preserving the ability to share data efficiently with authorized users. Using additional keys, in current security systems, is computationally expensive and difficult to administer and increases the time the data is in a vulnerable state.

Prior art defeats the combination of possible features. In one example, a security system might allow efficient sharing but only use a single key enabling a breach to expose all of the data. In a second example, a security system might use multiple keys thus limiting exposure but sharing becomes very expensive and requires significant user effort. Realistically, users will not normally accept stronger security if it is cumbersome to implement.

SUMMARY

With the above in mind, embodiments of the present invention are related to sharing protected content with multiple users. More particularly, the sharing the protected content between multiple users involves encryption and decryption using a shared secret.

These and other features, objectives and advantages of the present invention are provided by a non-transitory computer-readable medium for sharing protected content, comprising instruction stored thereon, that when executed on a processor perform the steps comprising deriving a shared secret using an elliptic curve Diffie-Hellman method, processing the shared secret using a secure hash algorithm 256 cryptographic hash to produce a primary encryption key, and encrypting a secondary encryption key using the primary encryption key. The shared secret is derived between a private component of an elliptic curve cryptography Diffie-Hellman key pair of a first user and one of a public component of the elliptic curve cryptography Diffie-Hellman key pair of the first user and a public component of an elliptic curve cryptography Diffie-Hellman key pair of a second user. When the shared secret is derived between the private component of the elliptic curve cryptography Diffie-Hellman key pair of the first user and the public component of the elliptic curve cryptography Diffie-Hellman key pair of the first user, encrypting the protected content using the secondary encryption key and transmitting the encrypted protected content to a server to be accessed by the second user. When the shared secret is derived between the private component of the elliptic curve cryptography Diffie-Hellman key pair of the first user and the public component of the elliptic curve cryptography Diffie-Hellman key pair of the second user, transmitting the secondary encryption key to the second user. The second user uses the secondary encryption key to decrypt the encrypted protected content on the server.

In other embodiments, the present invention may include a computer-implemented method for sharing protected content, comprising executing on a processor the steps comprising encrypting a private component of an elliptic curve cryptography Diffie-Hellman key pair of a first user using a password hashed by a Bcrypt algorithm using 8-cost and 16-byte salt, deriving a shared secret using an elliptic curve Diffie-Hellman method, processing the shared secret using a secure hash algorithm 256 cryptographic hash to produce a primary encryption key, and encrypting a secondary encryption key using the primary encryption key. The shared secret is derived between the private component of the elliptic curve cryptography Diffie-Hellman key pair of the first user and one of a public component of the elliptic curve cryptography Diffie-Hellman key pair of the first user and a public component of an elliptic curve cryptography Diffie-Hellman key pair of a second user. When the shared secret is derived between the private component of the elliptic curve cryptography Diffie-Hellman key pair of the first user and the public component of the elliptic curve cryptography Diffie-Hellman key pair of the first user, encrypting the protected content using the secondary encryption key and transmitting the encrypted protected content to a common point of access to be accessed by the second user. When the shared secret is derived between the private component of the elliptic curve cryptography Diffie-Hellman key pair of the first user and the public component of the elliptic curve cryptography Diffie-Hellman key pair of the second user, transmitting the secondary encryption key to the second user. The second user uses the secondary encryption key to decrypt the encrypted protected content at the common point of access.

In yet other embodiments, the present invention may include a computer-implemented method for sharing, by a first user, protected content with a plurality of trusted users, comprising executing on a processor the steps comprising deriving a first shared secret, processing the first shared secret using a secure hash algorithm 256 cryptographic hash to produce a first primary advanced encryption standard 256-bit key, encrypting a first secondary advanced encryption standard 256-bit key using the first primary advanced encryption standard 256-bit key, encrypting the protected content using the first secondary advanced encryption standard 256-bit key, and transmitting the encrypted protected content to a common point of access to be accessed by the plurality of trusted users. For each trusted user, deriving a second shared secret, processing the second shared secret using a secure hash algorithm 256 cryptographic hash to produce a second primary advanced encryption standard 256-bit key, encrypting a second secondary advanced encryption standard 256-bit key using the second primary advanced encryption standard 256-bit key, and transmitting the second secondary advanced encryption standard 256-bit key to the trusted user, wherein the trusted user uses the second secondary advanced encryption standard 256-bit key to decrypt the encrypted protected content.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
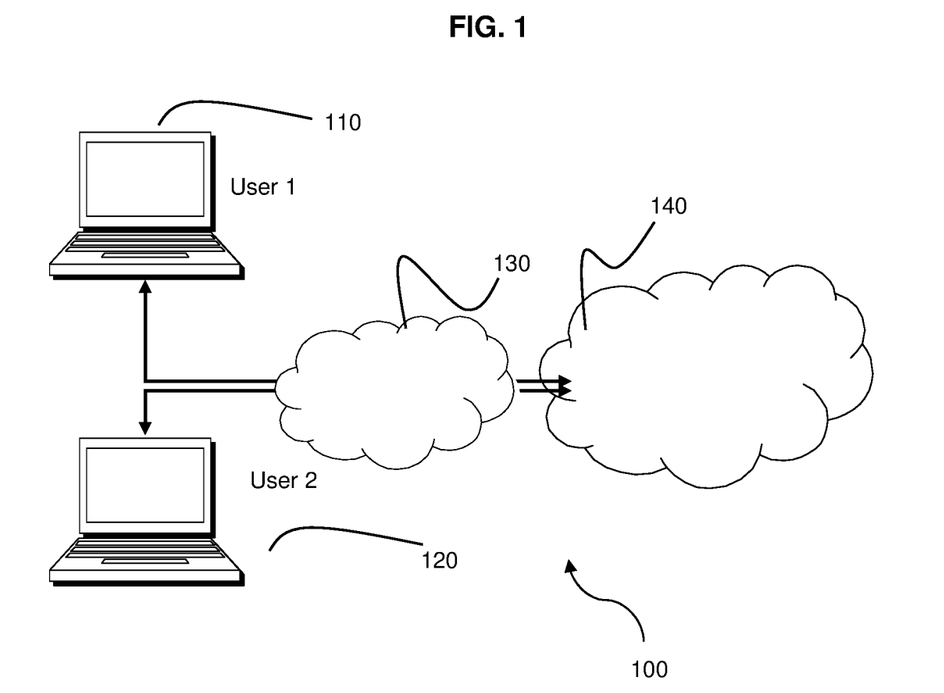
FIG. 1 illustrates in schematic form a multiple user data storage and exchange system according to some embodiments.

FIG. 1 illustrates in schematic form a multiple user data storage and exchange system 100 according to some embodiments. The data storage and exchange system 100 comprises a first user 110, a second user 120, a communication network 130, and a common point of access 140.

The first user 110 and second user 120 transmit to and retrieve data from the common point of access 140 using the communication network 130. Files are sent from the first user 110 and second user 120 through the communication 130 and to the common point of access 140. The common point of access 140 stores the files. The first user 110 and second user 120 send a retrieval request to the common point of access 140. The common point of access 140 transmits the files through the communication network 130 to the first user 110 and the second user 120. The common point of access 140 may be any network, device, or combination of devices configured to receive, store, and transmit data to multiple users. The common point of access 140 may comprise a plurality of storage devices that store content requested by users. The common point of access 140 may be a server system or the cloud. The communication network 130 may comprise a plurality of routers, servers, bridges, switches, and combinations of such devices that provide connectivity between the common point of access 140 and the users.

The data storage and exchange system 100 may allow the first user 110 to encrypt data and store that encrypted data on the common point of access 140. That data may be retrieved by the second user 120 from the common point of access and decrypted using the same algorithm used to encrypt the data. In another embodiment, the first user 110 may retrieve the data they sent to the common point of access 140 and decrypt the data themselves. The methodology allows all users connected to the common point of access 140 to encrypt data that may be decrypted by the original user or another "trusted" user employing the same algorithm.

Figure 2:
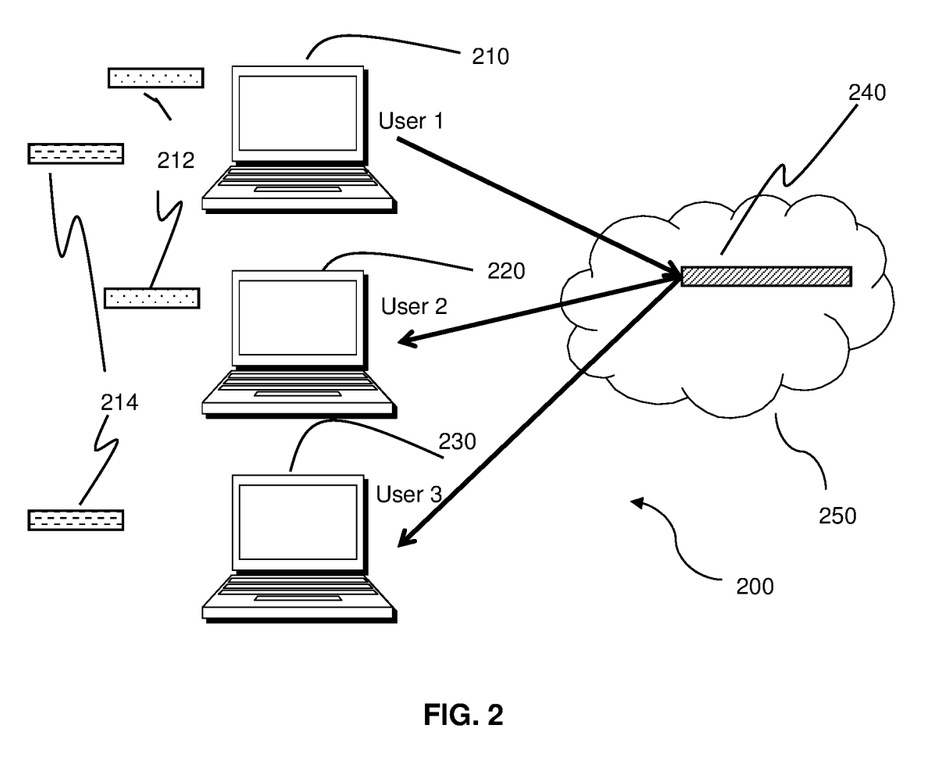
FIG. 2 illustrates in schematic form a data exchange to multiple receiving users according to some embodiments.

FIG. 2 illustrates in schematic form a data exchange 200 to multiple receiving users according to some embodiments. The data exchange 200 comprises a first user 210, a second user 220, a third user 230, content 240, a common point of access 250, a first shared secret 212, and a second shared secret 214. The first user 210, second user 220, and third user 230 are each electronically connected to a common point of access 250. The content 240 is stored on the common point of access 250.

The first user 210 encrypts the content 240 and stores the content 240 on the common point of access 250. The first user 210 develops the first shared secret 212 and transmits the first shared secret 212 to the second user 220. The second user 220 may use the first shared secret 212 to decrypt the content 240 stored on the common point of access 250. The first user 210 develops a second shared secret 214 and transmits the second shared secret 214 to the third user 230. The third user 230 may use the second shared secret 214 to decrypt the content 240 stored on the common point of access 250. The first shared secret 212 and the second shared secret 214 are specific to the second user 220 and the third user 230, respectively. A plurality of shared secrets may be developed for a plurality of trusted users. The plurality of shared secrets are unique and correspond with the trusted user that receives that shared secret.

The data exchange 200 may allow users to encrypt and decrypt files and file encryption keys using a common secret which may be shared using a public key and a protected private key. The public and private keys are derived using an elliptic curve algorithm and they are subsequently used by an elliptic curve Diffie-Hellman algorithm to create a secret that may be used to encrypt and decrypt files. The elliptic curve Diffie-Hellman algorithm provides the basis for generating a shared secret based upon the exchange of public keys between two parties. Since the shared secret can only be known to the parties who have the means to decrypt it, the data remains secure. In one embodiment, the data exchange 200 only shares the intended file the shared secret and may not allow users access to any other files or the first user's 210 private keys. In another embodiment, the data exchange 200 may allow the first user 210 to revoke access to a particular trusted user by deleting an encryption key that is encrypted with the secret shared with the trusted user.

Figure 3:
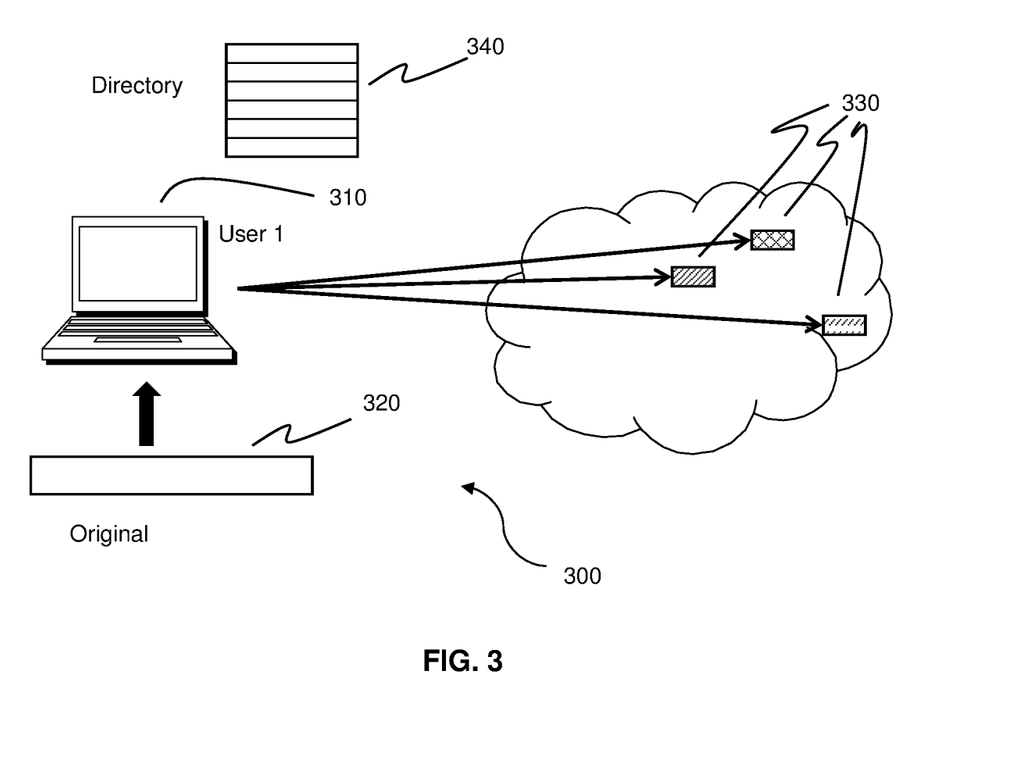
FIG. 3 illustrates in schematic form a data exchange of fragmented content according to some embodiments.

FIG. 3 illustrates in schematic form a data exchange of fragmented content 300 according to some embodiments. The data exchange of fragmented content 300 comprises a user computer 310, a directory structure 340, content 320, and a plurality of fragments 330. The content 320 may be fragmented into a plurality of fragments 330. Each fragment 330 may be encrypted with its own file key. In one embodiment, the data structure 340 may provide information to reconstruct the plurality of fragments 330 into the content 320. In another embodiment, the directory structure 340 may be encrypted. In another embodiment, the directory structure 340 may be stored locally on the user computer 310. In yet another embodiment, the directory structure 340 may be stored in a common point of access. The common point of access may comprise, but is not limited to the hereinabove mentioned common points of access.

Figure 4:
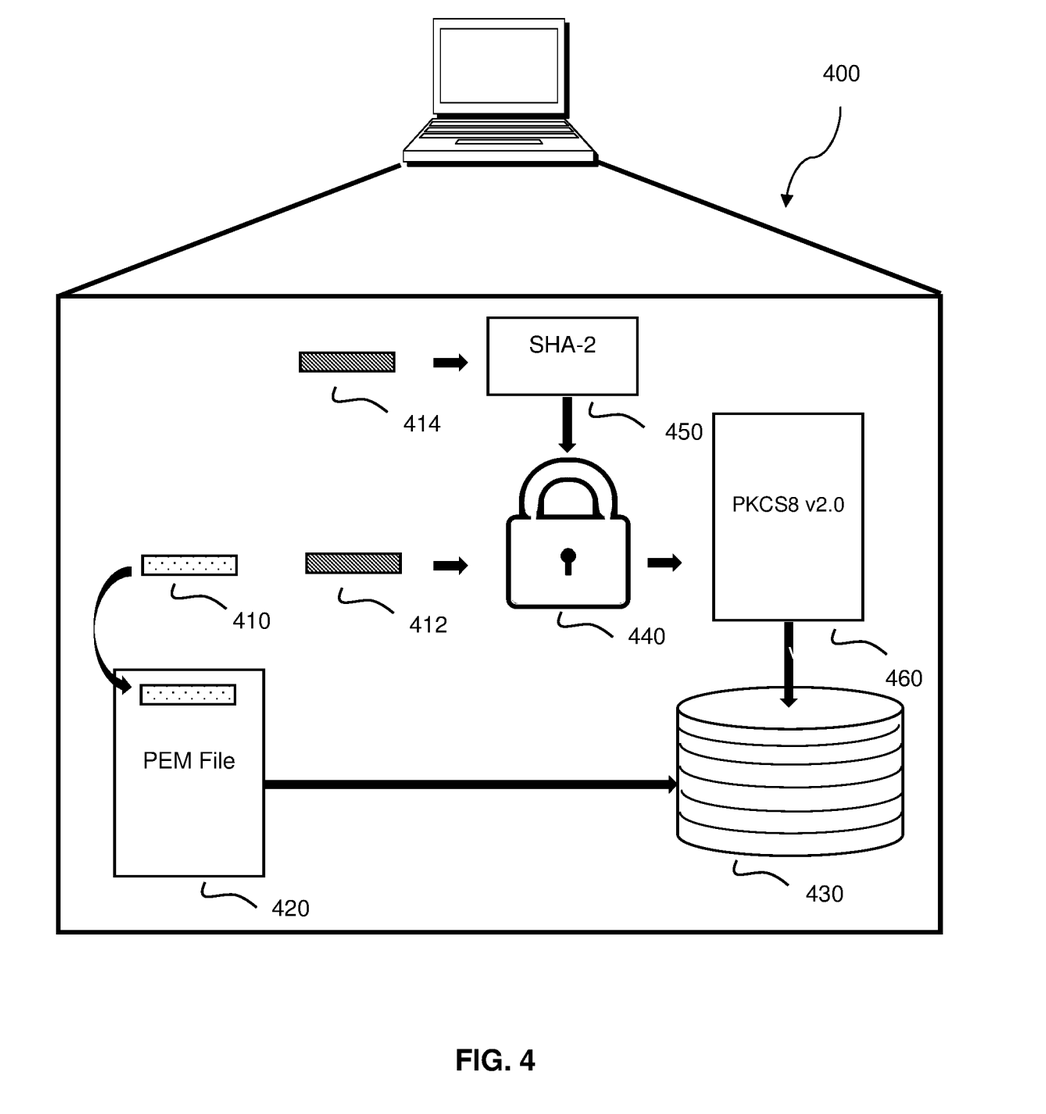
FIG. 4 illustrates in schematic form a user computer according to some embodiments.

FIG. 4 illustrates in schematic form a user computer 400 according to some embodiments. The user computer 400 comprises a public key 410, a private key 412, a user password 414, a privacy enhancement mail (hereinafter referred to as "PEM") formatted file 420, a file store 430, and a Public Key Cryptography Standards 8 (hereinafter referred to as "PKCS8") v2.0 container 460. In one embodiment, the public key 410 may be stored in the PEM formatted file 420.

In one embodiment, the user computer 400 may provide protection for the user password 414. The user password 414 may be stored locally and may be exchanged between parties using a method of choice. One of ordinary skill in the art will understand that there are many ways to communicate a password between parties and this feature is not material to the process discussed herein. The user password 414 may be hashed for storage using an industry standard Bcrypt algorithm. One of ordinary skill in the art will appreciate that there are a plurality of algorithms that may hash the user password 414 for storage and are not distinguished from this embodiment. The Bcrypt algorithm may use random data, hereinafter referred to as salt, to defend against dictionary attacks and similar attacks used by malicious attackers. The salt and the user password 414 may be concatenated and processed with a cryptographic hash function and the resulting output may be stored with the salt. The hashing may allow for later authentication while protecting a plaintext version of the user password 414 in an event that authentication data store is breached. In one embodiment, an 8-cost and 16-byte salt may be used. The salt may be generated on a per-user basis from a hardware true random number generator: Format in DB is $2y$08$<salt><hash> with base64 encoding.

In one embodiment, the user computer 400 may comprise a 384-bit elliptic curve public and private key pair. In FIG. 4 the key pair may be represented as the public key 410 and the private key 412. An elliptic curve is a plane curve over a finite field which may consist of points satisfying an equation (comprising a single point hypothetically located at infinity). Coordinates may be chosen to be from a fixed finite field of characteristic and not equal to 2 or 3.

In another embodiment, the user computer 400 may use a National Institute of Standards and Technology/Standards for Efficient Cryptography Group (hereinafter referred to as "NIST/SECG") curve over a 384-bit prime field. The SECG curve is recommended by National Security Administration (hereinafter referred to as "NSA") Suite B and in open Secure Sockets Layer (hereinafter referred to as "SSL") it may be referred to as secp384r1. The public key 410 may be stored in the PEM formatted file (as defined in Request for Comments (hereinafter referred to as "RFC") 1421 through RFC 1424) and in the file store 430 of the user computer 400. The private key 312 may be encrypted using Advanced Encryption Standard (hereinafter referred to as "AES")-256-Cipher Block Chaining (hereinafter referred to as "CBC") 440. AES is a NIST standard encryption protocol based on the Rijndael cipher. The user password 414 may be encrypted using a 256-bit Secure Hash Algorithm (hereinafter referred to as "SHA")-2 hash 450 and used as an encryption key for encryption of the private key 412. SHA-2 is a set of cryptographic hash functions designed by the NSA. A resulting encrypted private key may be kept in the PKCS8 v2.0 container 460 which may be placed in the file storage 430 of the user computer 400.

Figure 5:
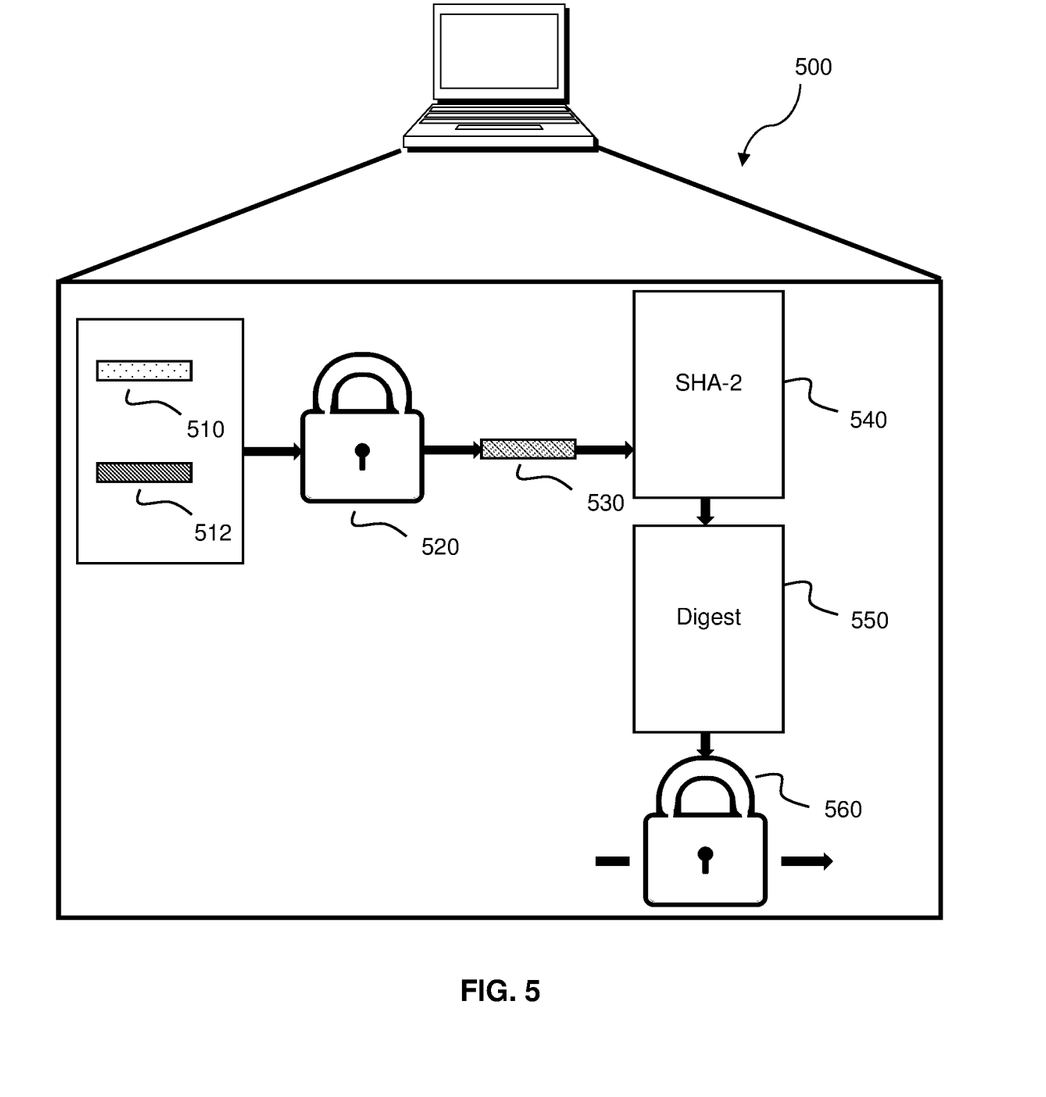
FIG. 5 illustrates in schematic form a user computer according to some embodiments.

FIG. 5 illustrates in schematic form a user computer 500 according to some embodiments. The user computer 500 may be the same user computer 400 of FIG. 4. The user computer 500 comprises a public key 510 and a private key 512. The public key 510 and private key 512 may be the public key 410 and private key 412 of FIG. 4.

In one embodiment, the public key 510 and private key 512 may be input to an elliptic curve Diffie-Hellman (hereinafter referred to as "ECDH") function 520 which may output a shared secret 530. The shared secret 530 may be a 384-bit shared secret. The shared secret 530 may be hashed using an SHA-2 (SHA-256) hashing algorithm 540 which may create a digest 550 that may be used to provide an AES-256-CBC encryption 560 for an unencrypted file key. Once the file key is accessible, a file may be unencrypted and accessed.

Two parties operating similarly to the user computer 500 may utilize the shared secret 530 to encrypt and decrypt files that may be created by only an exchange of the public key 510 information. Computationally, derivation of the shared secret 530 is likely much less than derivation of a private key as in traditional Rivest, Shamir, and Adleman (hereinafter referred to as "RSA") public/private key asymmetric schema. Furthermore, the file need only be encrypted once and additional controlled access may be granted or revoked using the shared secret 530.

An encryption, like the one utilized by the user computer 500 hereinabove, allows for using ECDH as a method to share encrypted data using public key cryptography. In some embodiments, the private key 512 and public key 510 may be Elliptic Curve Cryptography (hereinafter referred to as "ECC") keys. The file key may be referred to as a secondary encryption key. A key that is used to encrypt the file key may be referred to as a primary encryption key. The secondary encryption key may be an AES-256 key. The primary encryption key may be an entropy-rich AES-256 key. In one embodiment, the secondary encryption key may be used to encrypt other data that may be shared between ECC key holders without exposing each other's private keys to each other, nor exposing protected content to outside viewers, such as untrusted outside users.

Figure 6:
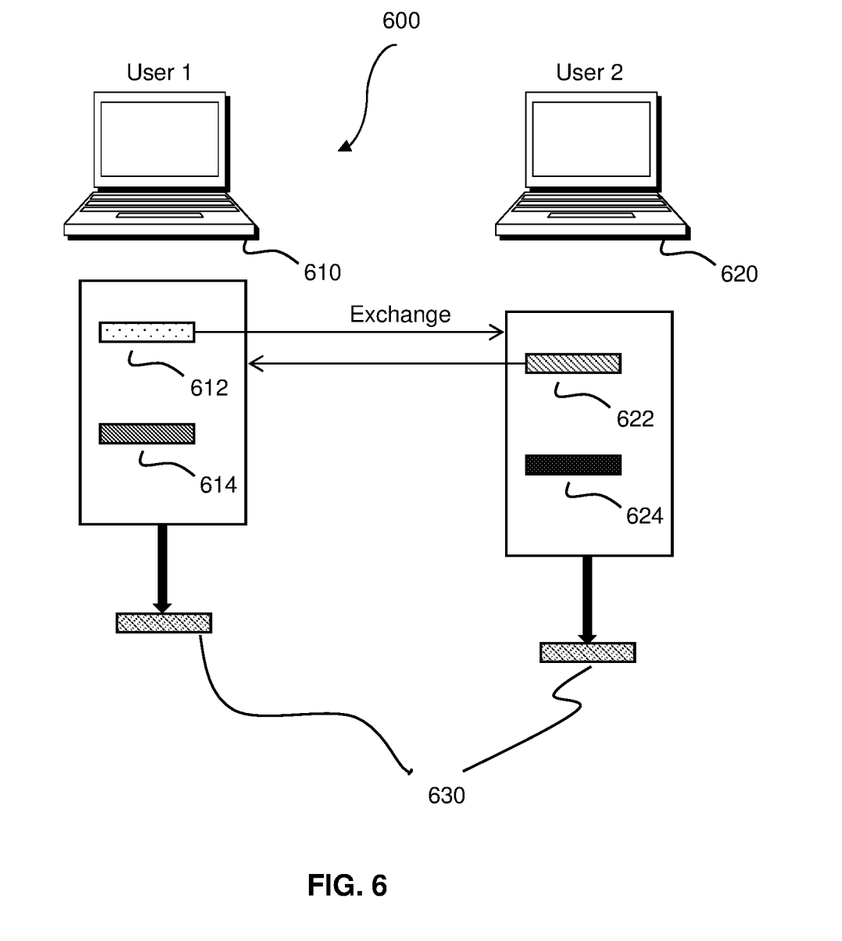
FIG. 6 illustrates in schematic form a generation of a shared secret according to some embodiments.

FIG. 6 illustrates in schematic form a generation of a shared secret 600 according to some embodiments. The generation of a shared secret 600 comprises a first user computer 610 and a second user computer 620. The first user computer 610 may be the user computer 500 of FIG. 5. The first user computer 610 comprises a public key 612 and a private key 614. The public key 612 and the private key 614 may be the public key 510 and private key 512 of FIG. 5. The second user computer comprises a public key 622 and a private key 624.

In one embodiment, the first user computer 610 encrypts some content which may be stored in a common point of access. The first user computer 610 and the second user computer 620 may exchange public key 612 and public key 622 with each other. The first user computer 610 and the second user computer 620 do not exchange private key 614 and private key 624. A shared secret 630 is derived between the first user computer 610 and the second user computer 620. The shared secret may be represented by Equation 1:

$$\text{private key } 614 \times \text{public key } 622 = \text{private key } 624 \times \text{public key } 612 \quad \text{[Equation 1]}$$

and may be used to hash and ultimately used to encrypt or decrypt content.

In one embodiment, the first user computer 610 and the second user computer 620 may access the content through a web interface or an application running on a personal computer or mobile device. One of ordinary skill in the art will appreciate that there are a plurality of methods to access content by a user and do not distinguish from the embodiments discussed herein. The first user computer 610 may create a shared secret 630 with itself using public key 612 and private key 614 in the ECDH algorithm which may then be used to encrypt the content. The content may then be transmitted to the common point of access securely, using a Transport Layer Security (hereinafter referred to as "TLS") session. On the common point of access, a 256-bit key may be created and the content further encrypted using the 256-bit key in AES-256-CBC. The now further encrypted content may be stored on the common point of access's storage. The first user computer 610 and the second user computer 620 may now derive the shared secret 630 that may be used to decrypt the content that is accessible on the common point of access.

It is desirable to use public key cryptography to share data without sharing secrets and exposing each end to compromise. Some embodiments may allow a security system to use a very large number of keys, such that the amount of data protected by each key may be much smaller, and may enable a single user to share data with multiple authorized recipients (trusted users) in a fast, efficient way. This may be accomplished by changing the method of calculating the shared secret between two users. The data need not be re-encrypted for each user, only the shared secret is recalculated. Further, it may be desirable to perform these operations using faster public keys, such as ECC, since RSA decryption is relatively slow and requires additional processing power.

Some embodiments may require the use of a hierarchy of keys for implementation. A file, or segment of a file, may be protected with a file key. The file key may then then protected by a share key. This may be known in the prior art. Some embodiments differ in the generation and protection of the share key. The embodiments may protect the share key using a shared secret that is only available to the file owner and the file recipient. That shared secret may be developed, calculated and created by using the ECDH algorithm on asymmetric keys belonging to the file recipient and file owner. Using some embodiments, the sharing of files may be highly secure and minimize computational overhead and files may not need to be re-encrypted when shared with multiple recipients.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A non-transitory computer-readable medium for sharing protected content, including instructions stored thereon, that when executed on a processor perform a method comprising:

deriving a shared secret using an elliptic curve Diffie-Hellman method, wherein the shared secret is derived between a private component of an elliptic curve cryptography Diffie-Hellman key pair of a first user and a public component of the elliptic curve cryptography Diffie-Hellman key pair of the first user and a public component of an elliptic curve cryptography Diffie-Hellman key pair of a second user, the private component of the elliptic curve cryptography Diffie-Hellman key pair of the first user encrypted using a hashed password of the first user;

processing the shared secret using a secure hash algorithm 256 cryptographic hash to produce a primary encryption key;

encrypting a secondary encryption key using the primary encryption key; and in response to the shared secret being derived between the private component of the elliptic curve cryptography Diffie-Hellman key pair of the first user and the public component of the elliptic curve cryptography Diffie-Hellman key pair of the first user:
  encrypting the protected content using the secondary encryption key; and
  transmitting the encrypted protected content to a common point of access to be accessed by the second user.

2. The non-transitory computer-readable medium of claim 1 comprising a directory structure stored thereon, wherein the protected content is fragmented, and wherein the directory structure comprises information to reconstruct the fragments of the content.

3. The non-transitory computer-readable medium of claim 2 wherein each fragment is encrypted with a file key.

4. The non-transitory computer-readable medium of claim 2 wherein the directory structure is encrypted.

5. The non-transitory computer-readable medium of claim 1 wherein the primary and secondary encryption keys are advanced encryption standard 256-bit keys.

6. The non-transitory computer-readable medium of claim 5 wherein the advanced encryption standard 256-bit keys are configured to be used for software based encryption and decryption.

7. The non-transitory computer-readable medium of claim 1 comprising a privacy enhancement mail formatted file stored thereon, wherein the public component of the elliptic curve cryptography Diffie-Hellman key pair of the first user is stored in the privacy enhancement mail formatted file.

8. The non-transitory computer-readable medium of claim 1 wherein the password is hashed by a Bcrypt algorithm using salt.

9. The non-transitory computer-readable medium of claim 8 wherein the salt comprises an 8-cost and 16-byte salt.

10. The non-transitory computer-readable medium of claim 8 wherein the salt is generated on a per-user basis from a hardware true random number generator.

11. The non-transitory computer-readable medium of claim 1, including further instructions stored thereon, that when executed on the processor perform the method comprising:
  in response to the shared secret being derived between the private component of the elliptic curve cryptography Diffie-Hellman key pair of the first user and the public component of the elliptic curve cryptography Diffie-Hellman key pair of the second user:
    transmitting the secondary encryption key to the second user, wherein the second user uses the secondary encryption key to decrypt the encrypted protected content on the common point of access.

12. A computer-implemented method for sharing protected content, comprising:
  encrypting a private component of an elliptic curve cryptography Diffie-Hellman key pair of a first user using a password hashed by a Bcrypt algorithm using 8-cost and 16-byte salt;
  deriving a shared secret using an elliptic curve Diffie-Hellman method, wherein the shared secret is derived between the private component of the elliptic curve cryptography Diffie-Hellman key pair of the first user and one of a public component of the elliptic curve cryptography Diffie-Hellman key pair of the first user and a public component of an elliptic curve cryptography Diffie-Hellman key pair of a second user;
  processing the shared secret using a secure hash algorithm 256 cryptographic hash to produce a primary encryption key;
  encrypting a secondary encryption key using the primary encryption key; and in response to the shared secret being derived between the private component of the elliptic curve cryptography Diffie-Hellman key pair of the first user and the public component of the elliptic curve cryptography Diffie-Hellman key pair of the first user:
    encrypting the protected content using the secondary encryption key; and
    transmitting the encrypted protected content to a common point of access to be accessed by the second user.

13. The computer-implemented method of claim 12 further comprising fragmenting the protected content.

14. The computer-implemented method of claim 13 further comprising encrypting each fragment of the protected content.

15. The computer-implemented method of claim 12 wherein the first user accesses the protected content by interfacing with at least one of a web interface, an application running on a computer, and an application running on a mobile device.

16. The computer-implemented method of claim 12 wherein transmitting the encrypted protected content to the common point of access to be accessed by the second user includes transmitting the encrypted protected content to a server to be accessed by the second user.

17. The computer-implemented method of claim 16 wherein transmitting the encrypted protected content to the server includes transmitting the encrypted protected content to the server securely using a transport layer security session.

18. The computer-implemented method of claim 12, further comprising:
  in response to the shared secret being derived between the private component of the elliptic curve cryptography Diffie-Hellman key pair of the first user and the public component of the elliptic curve cryptography Diffie-Hellman key pair of the second user:
    transmitting the secondary encryption key to the second user, wherein the second user uses the secondary encryption key to decrypt the encrypted protected content at the common point of access.

19. A computer-implemented method for sharing, by a first user, protected content with a plurality of trusted users, comprising:
  deriving a first shared secret using a private component of a key pair of the first user encrypted using a hashed password of the first user;
  processing the first shared secret using a secure hash algorithm 256 cryptographic hash to produce a first primary advanced encryption standard 256-bit key;
  encrypting a first secondary advanced encryption standard 256-bit key using the first primary advanced encryption standard 256-bit key;
  encrypting the protected content using the first secondary advanced encryption standard 256-bit key to obtain an encrypted file; and
  transmitting the encrypted file to a common point of access to be accessed by the plurality of trusted users;
  for each trusted user of the plurality of trusted users:
    deriving a second shared secret;

processing the second shared secret using a secure hash algorithm 256 cryptographic hash to produce a second primary advanced encryption standard 256-bit key;

encrypting a second secondary advanced encryption standard 256-bit key using the second primary advanced encryption standard 256-bit key; and transmitting the second secondary advanced encryption standard 256-bit key to the trusted user, wherein the trusted user uses the second secondary advanced encryption standard 256-bit key to decrypt the encrypted file on the common point of access.

20. The computer-implemented method of claim 19 wherein the respective second shared secret of each of the plurality of trusted users is unique to the second shared secrets of the rest of the plurality of trusted users.

21. The computer-implemented method of claim 19 wherein deriving the first shared secret comprises deriving the first shared secret using an elliptic curve Diffie-Hellman method, wherein the first shared secret is derived between a private component of an elliptic curve cryptography Diffie-Hellman key pair of the first user and a public component of the elliptic curve cryptography Diffie-Hellman key pair of the first user, the private component of the elliptic curve cryptography Diffie-Hellman key pair of the first user encrypted using the hashed password of the first user; and wherein deriving the second shared secret for each trusted user comprises deriving the respective second shared secret using an elliptic curve Diffie-Hellman method, wherein the respective second shared secret is derived between the private component of the elliptic curve cryptography Diffie-Hellman key pair of the first user and a respective public component of an elliptic curve cryptography Diffie-Hellman key pair of the trusted user.

22. The computer-implemented method of claim 21 wherein the private component of the elliptic curve cryptography Diffie-Hellman key pair of the first user, the public component of the elliptic curve cryptography Diffie-Hellman key pair of the first user, and the public components of the elliptic curve cryptography Diffie-Hellman key pairs of the trusted users are each 384-bit elliptic curve cryptography Diffie-Hellman key pairs.

23. A non-transitory computer-readable medium for sharing protected content, including instructions stored thereon, that when executed on a processor perform a method comprising:

deriving a shared secret using a key agreement protocol, wherein the shared secret is derived between a private component of a first key pair of the key agreement protocol of a first user and one of a public component of the first key pair of the first user and a public component of a second key pair of the key agreement protocol of a second user, the private component of the first key pair of the key agreement protocol of the first user encrypted using a hashed password of the first user;

processing the shared secret using a cryptographic hash function to produce a primary encryption key;

encrypting a secondary encryption key using the primary encryption key; and in response to the shared secret being derived between the private component of the first key pair of the first user and the public component of the first key pair of the first user:
  encrypting the protected content using the secondary encryption key; and
  transmitting the encrypted protected content to a common point of access to be accessed by the second user.

24. The non-transitory computer-readable medium of claim 23, including further instructions stored thereon, that when executed on the processor perform the method comprising:

in response to the shared secret being derived between the private component of the first key pair of the first user and the public component of the second key pair of the second user:
  transmitting the secondary encryption key to the second user, wherein the second user uses the secondary encryption key to decrypt the encrypted protected content on the common point of access.

25. The non-transitory computer-readable medium of claim 23, wherein the key agreement protocol includes an elliptic curve Diffie-Helman method.

26. The non-transitory computer-readable medium of claim 23, wherein the cryptographic hash function includes a secure hash algorithm 256 cryptographic hash.

* * * * *